(12) United States Patent
Diedrich et al.

(10) Patent No.: US 6,424,452 B1
(45) Date of Patent: Jul. 23, 2002

(54) TRANSVERSAL ELECTROOPTICAL MODULATOR

(75) Inventors: Frank Diedrich, Germering; Mario Ledig, Gauting; Thomas Fehn, Kronach; Thomas Engel, Munich; Frank Reissmann, Greiz, all of (DE)

(73) Assignee: Gsanger Optoelektronik GmbH & Co., Gottingen (DE)

( * ) Notice: Subject to any disclaimer, the term of this patent is extended or adjusted under 35 U.S.C. 154(b) by 0 days.

(21) Appl. No.: 09/647,799

(22) PCT Filed: Apr. 1, 1999

(86) PCT No.: PCT/EP99/02235

§ 371 (c)(1),
(2), (4) Date: Oct. 5, 2000

(87) PCT Pub. No.: WO99/53364

PCT Pub. Date: Oct. 21, 1999

(30) Foreign Application Priority Data

Aug. 4, 1998 (DE) .......................... 198 15 841

(51) Int. Cl.⁷ .............................. G02F 1/00; G02F 1/01; G02F 1/03

(52) U.S. Cl. .................. 359/322; 359/246; 359/254

(58) Field of Search .................. 359/245, 246, 359/250, 251, 252, 254, 255, 260, 322, 326

(56) References Cited

U.S. PATENT DOCUMENTS 3,827,000 A * 7/1974 Matsushita et al. ......... 359/259

* cited by examiner

*Primary Examiner*—Georgia Epps
*Assistant Examiner*—David N. Spector
(74) *Attorney, Agent, or Firm*—Antonelli, Terry, Stout & Kraus, LLP

(57) ABSTRACT

The invention relates to a transversal electrooptical modulator (10) which can be controlled by means of an electric amplifier, comprising at least two elements for modulating (11) the light wave of a laser beam, and can preferably be used for projection of TV images. The invention is characterized in that the modulator elements are arranged behind each other in relation to the laser beam, that a focusing device (14) is arranged both in front of and behind each modulator element, that an electric amplifier output (22, 23) is associated with each modulator element and that all electric amplifier (A) inputs (24, 25) are connected to the same control line (26) as the control signal.

9 Claims, 1 Drawing Sheet

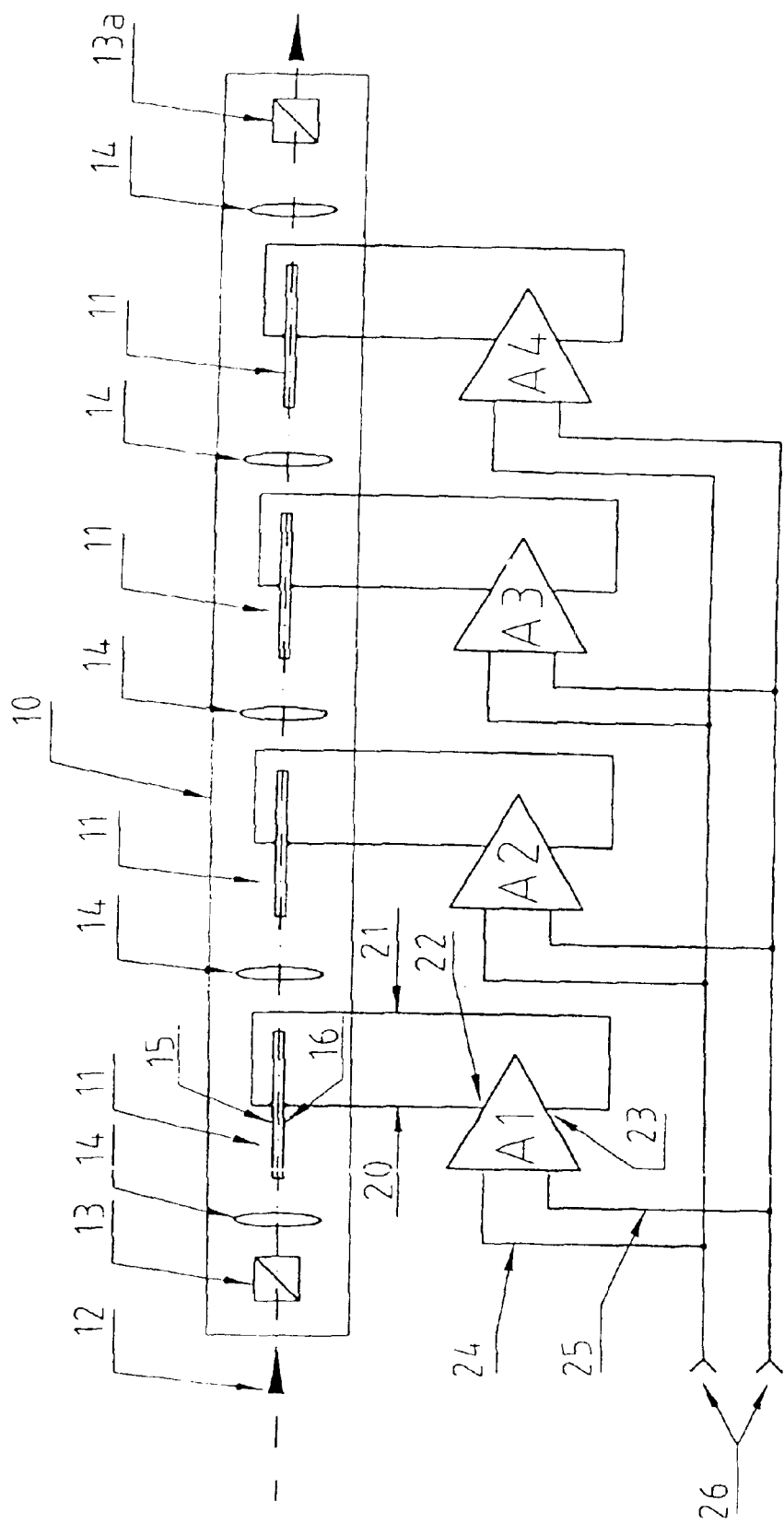

TRANSVERSAL ELECTROOPTICAL MODULATOR

BACKGROUND OF THE INVENTION

The invention relates to a transverse electrooptic modulator (EOM) drivable by electrical amplifiers, said modulator consisting of at least two modulator elements for modulating the light wave of a laser beam, preferably for television image projection.

The use of laser radiation sources in television image projection is well known (German Patent 43 06 797).

Currently, acoustooptic and electrooptic modulators are employed in the projection of television images. In the case of the former, the low cost of the system is advantageous, while the poor efficiency is disadvantageous. In order to achieve high modulation bandwidth, a high degree of focusing is required; however this results in low diffraction efficiency. Additionally, the quality of the wave fronts is degraded, and the coupling efficiency in optical fibers is thereby also degraded.

With electrooptic modulators, the attainable high optical efficiency is advantageous. Currently offered electrooptic modulators are available which have optical losses of less than 10% (e.g. Data Sheet LM 0202 from Gesanger Optoelektronik). The disadvantage here is the high driving voltage, typically several 100V. Consequently, expensive electrical amplifiers and driving devices are required which result in a high system price.

SUMMARY OF THE INVENTION

The goal of the invention is thus to create an EOM according to the species, of small size and inexpensive to fabricate, which is suitable for a contrast ratio of at least 1:1000 and which has the highest possible optical efficiency at a modulation bandwidth of up to 90 MHz.

This goal is achieved according to the invention by arranging the modulator elements in series, locating a focusing device in front of and behind preferably every other modulator element, associating the output of each electrical amplifier with each modulator element, and connecting the inputs of all the electric amplifiers to the same control circuit for the control signal.

By arranging several optical modulator elements in series, the driving voltage for each modulator element may be reduced. This series connection with high optical efficiency can only be ensured if a focusing device is located in front of and behind each, preferably every other, modulator element so that a narrowing of the beam falls within each modulator element. In this case, for example with four modulator elements, a driving voltage of less than 50V is possible so that simple-to-fabricate, or commercially available electrical amplifiers, for example, video-output-amplifier chips (hereafter abbreviated as "video chips") may be used, whereby one video chip drives one modulator element, and the same control signal is applied to the inputs of all video chips.

It has proven especially advantageous if, according to the invention, such modulator elements are provided which exhibit at least two or three of the following characteristic data:

The electrical capacitance of one of the modulator elements is in the range of 5 pF to 20 pF.

The length of the modulator element is between 5 mm and 30 mm.

The dimension of the modulator element in the electrooptically effective range is 0.1 mm to 1 mm in the direction of the electrical field of the control signal, i.e. that of the thickness of the crystal.

This design allows for a considerably smaller size than that attainable in the prior art—with the result that the number of possible uses is considerably greater. Specifically, the EOM according to the invention may be used in exposure or projector systems. In addition, the crystal consumption of the new modulator is smaller by a factor of 100 than with current prior art EOMs due to the smaller size of said modulator.

The fundamentally critical mounting of the crystal on the carrier substrate must ensure both good electrical contact and good thermal conductivity. Said mounting must cause the smallest mechanical strains possible in each crystal since the contrast ratio obtainable for the EOM is impaired by mechanical strains. If the individual modulator elements are thus designed, according to the invention, to be wider than necessary and oriented on the substrate such that the electrooptically effective area nevertheless remains limited to an approximately square cross-section, the mounting of the crystal may be effected in a zone which lies far outside of the electrooptic modulation cross-section.

Additional useful embodiments further developments of the invention are identified in the subclaims.

BRIEF DESCRIPTION OF THE DRAWINGS

The following explains in more detail one embodiment of the invention with reference to the drawing. In this drawing, FIG. 1 shows the transverse electrooptic modulator in a schematic diagram of the driving circuit including the associated electrical amplifiers.

DETAILED DESCRIPTION OF THE PREFERRED EMBODIMENTS

Numeral 10 is the transverse electrooptic modulator (EOM) comprising a total of four modulator elements 11 which are aligned with the laser beam designated overall as 12. Polarizer 13 is located at the input of light beam 12, while in similar fashion polarizer 13a is located at the end. A biconvex lens 14 designed as a focusing device is located in front of and behind each modulator element 11 such that a narrowing of the beam falls within the range of each modulator element.

The first modulator element 11 is provided with electrodes 15, 16 which are connected via connectors 20, 21 with outputs 22, 23 of first electrical amplifier A1 whose two inputs 24, 25 are connected with the driving circuit designated overall as 26 for the control signal of first amplifier A1.

In the same way, an electrical amplifier A2, A3, and A4 (for the fourth and last modulator element 11) are accordingly associated with each modulator element 11.

During operation, laser beam 12, focused in each case in the range of each modulator element 11, is driven by the same control signal from control signal circuit 26, but through separate electrical amplifiers A1 through A4, which method has the advantage that as a result of the enhanced effective passage length, the switching voltage for each modulator element is correspondingly reduced so that conventional video chips may be utilized.

What is claimed is:

1. Transverse electrooptic modulator drivable by electrical amplifiers for modulating a light wave of a laser beam for television image projection, comprising:
    a plurality of modulator elements are arranged in series;
    a focusing device located in front of each modulator element;

a control circuit for providing a control signal; and a plurality of electrical amplifiers, each electrical amplifier comprising a video-output-chip, the output of each electrical amplifier being associated with each modulator element, and that the inputs of all the electrical amplifiers being connected to the same control circuit for the control signal.

2. Transverse electrooptic modulator according to claim 1, characterized in that the focusing device has at least one optical lens.

3. Transverse electrooptic modulator according to claim 1, characterized in that one polarizer is located in front of the first modulator element and one polarizer is located after the last modulator element.

4. Transverse electrooptic modulator according to claim 1, characterized in that each modulator element comprises single crystals of a material selected from the group consisting of ADP, AD*P, KDP, KD*P, KTP, KTA, RTA, lithium niobate, lithium tantalate, BBO, and potassium niobate.

5. Transverse electrooptic modulator according to claim 1, characterized in that the thickness of each modulator element, ranges from 0.1 mm to 1 mm, the electrical capacitance ranges between 5 pF and 20 pF, and the length of the transverse electrooptic modulator is between 5 mm and 30 mm.

6. Transverse electrooptic modulator according to claim 1, further comprising an additional focusing device located behind the last modulator element.

7. Transverse electrooptic modulator according to claim 1, characterized in that the thickness of each modulator element ranges from 0.1 mm to 1 mm.

8. Transverse electrooptic modulator according to claim 1, characterized in that the electrical capacitance ranges between 5 pF and 20 pF.

9. Transverse electrooptic modulator according to claim 1, characterized in that the length of the transverse electrooptic modulator is between 5 mm and 30 mm.

* * * * *